United States Patent [19]

Van Haandel

[11] Patent Number: 6,039,824

[45] Date of Patent: Mar. 21, 2000

[54] METHOD FOR REPAIRING A LOCALLY DAMAGED, DENTED SURFACE OF A WALL AS WELL AS A WALL COMPRISING SUCH A LOCALLY REPAIRED SURFACE

[75] Inventor: Johannes Henricus Maria Van Haandel, Boekel, Netherlands

[73] Assignee: Coöperatieve Vereniging Profile Repair, U.A.

[21] Appl. No.: 08/896,594

[22] Filed: Jul. 18, 1997

Related U.S. Application Data

[63] Continuation of application No. PCT/NL96/00036, Jan. 19, 1996.

[30] Foreign Application Priority Data

Jan. 25, 1995 [NL] Netherlands ............................. 9500133

[51] Int. Cl.[7] .................................................. B32B 35/00
[52] U.S. Cl. ............................................ 156/94; 427/140
[58] Field of Search ................................. 428/63; 156/93, 156/94, 98; 427/140

[56] References Cited

U.S. PATENT DOCUMENTS

| | | | |
|---|---|---|---|
| 3,765,975 | 10/1973 | Hollingsworth | 428/63 X |
| 4,473,419 | 9/1984 | Hardy | 428/63 X |
| 4,510,001 | 4/1985 | Speer | 156/98 |
| 4,596,848 | 6/1986 | Speer | 428/63 X |
| 4,824,500 | 4/1989 | White et al. | 156/98 X |
| 4,948,443 | 8/1990 | Speer | 156/98 X |

FOREIGN PATENT DOCUMENTS

| | | |
|---|---|---|
| 0 315 101 A3 | 5/1989 | European Pat. Off. . |
| 40 19 744 A1 | 6/1990 | Germany . |

OTHER PUBLICATIONS

NASA Tech Brief, "Better Seals for Vacuum Bags".
Questel Plus –EPOQUE 8912, Mar. 19, 1996.
Patent Abstracts of Japan, Oct. 21, 1991, vol. 15 No. 411.

*Primary Examiner*—Timothy M. Speer
*Attorney, Agent, or Firm*—Ronald C. Fish; Falk & Fish

[57] ABSTRACT

A method for repairing a locally damaged, dented surface of a wall, whereby the surface is provided with a relief, as well as a wall comprising a locally repaired surface, which has been repaired by using the method below. A mould comprising an impression of the relief of an undamaged part of the surface is made, the dented surface is filled with a filler, after which the impression on the mould is pressed into the filling material, as a result of which a relief corresponding with the original relief is formed in the filling material.

7 Claims, 1 Drawing Sheet

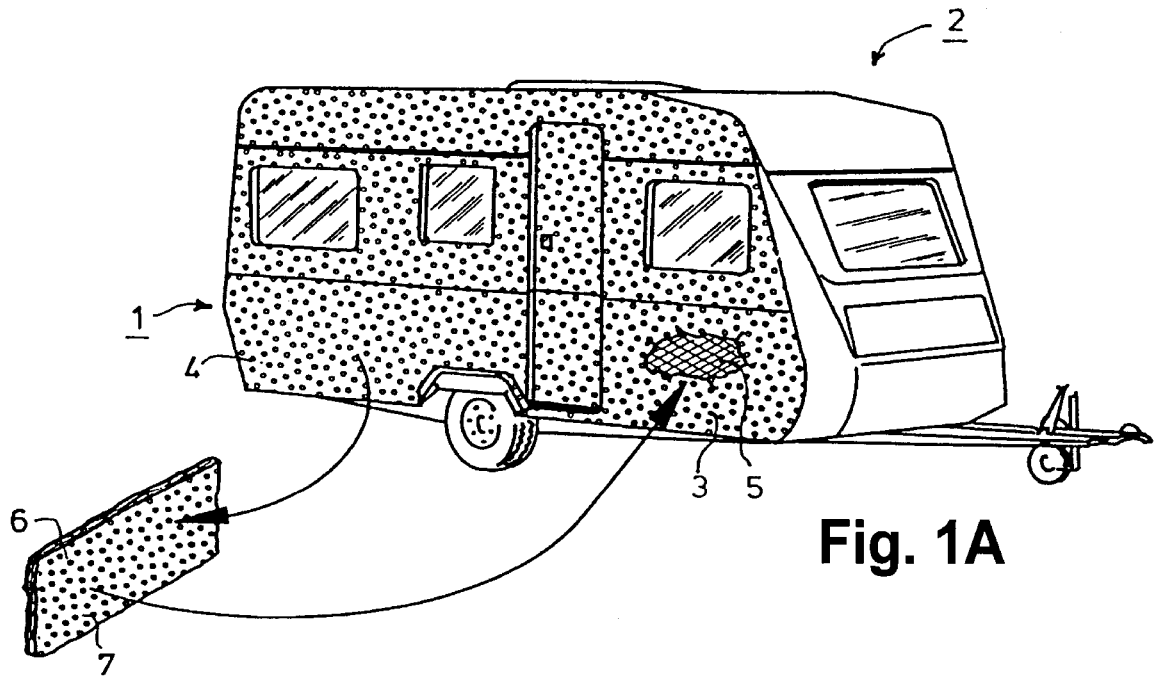
Fig. 1A
Fig. 1B
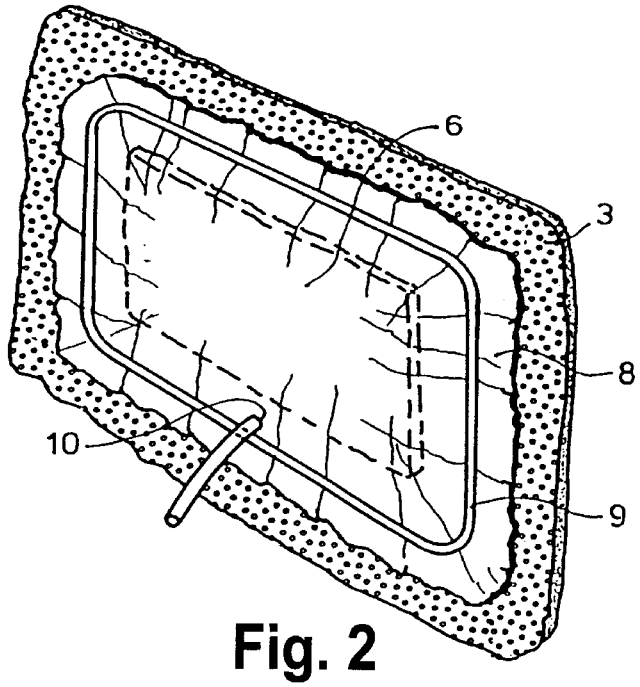
Fig. 2

METHOD FOR REPAIRING A LOCALLY DAMAGED, DENTED SURFACE OF A WALL AS WELL AS A WALL COMPRISING SUCH A LOCALLY REPAIRED SURFACE

This patent application is a continuation of and claims priority under 35 USC §120 and 35 USC §363 of a prior filed PCT case designating the U.S., said PCT case having the title A METHOD FOR REPAIRING A LOCAL DAMAGE, and having International Application Ser. No. PCT/NL96/00036, International Filing Date Jan. 19 1996, and also claims priority under 35 USC §119 to the parent Netherlands patent application entitled A METHOD FOR REPAIRING A LOCALLY DAMAGED, DENTED SURFACE OF A WALL AS WELL AS A WALL COMPRISING SUCH A LOCALLY REPAIRED SURFACE, Netherlands serial number 9500133, filed Jan. 25, 1995.

BACKGROUND OF THE INVENTION

A method for repairing a locally damaged, dented surface of a wall as well as a wall comprising such a locally repaired surface.

The invention relates to a method for repairing a locally damaged, dented surface of a wall, which wall is provided with a relief, whereby the dented surface is filled with a filler after which a relief is framed in the filler.

The invention furthermore relates to a wall comprising such a locally repaired surface.

Such a method has been described by U.S. Pat. No. 4,510,001 whereby a relief is formed in the filler by pressing a graining paper with a texture in the filler.

With this method the relief on the repaired damaged surface is only an approximation of the original relief.

SUMMARY OF THE INVENTION

The object of the present invention is to provide a method for repairing a locally damaged, dented profiled surface of a wall, wherein a relief corresponding with the original relief can be formed in the repaired surface in a simple and efficient manner.

This object is achieved with the method according to the invention in that the wall comprises a recurring relief whereby a relief in an undamaged part of the surface is looked up which corresponds with the former relief in the damaged surface, after which a mould is made of an impression of said corresponding relief. Subsequently, the dented surface is filled with a filler, after which the impression on the mould is pressed into the filler and a relief corresponding with the original relief is formed in the filler.

In this manner the original relief is formed in the damaged surface. As a result of this, the repaired surface will accurately match the undamaged relief, and it is no longer necessary to finish the transition area by hand. The repaired part is substantially undistinguishable on the repaired wall.

So far the repairing of a dented, profiled surface, for example the wall of a caravan, has been effected by filling the dent with a filler, after which it is attempted to form the original relief of the undamaged surface in the filler by means of a manual cutting or engraving operation. This is relatively laborious and time-consuming. If the original relief comprises a pattern of relatively small bumps or studs having different heights and diameters, it is nearly impossible to form the relief by hand, whereby the only alternative is to replace the wall as a whole. This is relatively costly and time-consuming.

One embodiment of the method according to the invention is characterized in that when a surface comprising a recurring relief is concerned a mould is made of a relief in an undamaged part of the surface which corresponds with the relief in the damaged surface.

In this manner the original relief is formed in the damaged surface. As a result of this the repaired surface will accurately match the undamaged relief, and it is no longer necessary to finish the transition area by hand. The repaired part is substantially undistinguishable on the repaired wall.

Another embodiment of the method according to the invention is characterized in that when a rolled relief is concerned, the pitch distance over which the relief recurs is determined, whereby the pitch distance is equal to the length of the circumference of a roller used in the rolling operation.

If the relief in the surface of the wall has been obtained by means of a rolling operation, the relief will recur over a fixed pitch distance. It has become apparent that with rolled, studded caravan walls, the pitch distance is generally less than 25 cm, so that it will be possible to find a relief corresponding with the damaged relief on practically every wall.

The invention will be explained in more detail hereafter with reference to the drawing, in which:

BRIEF DESCRIPTION OF THE DRAWINGS

FIG. 1 is a perspective view of damaged caravan;

FIG. 2 shows a damaged part of the caravan illustrated in FIG. 1, which part is repaired by using the method according to the invention.

DETAILED DESCRIPTION OF THE PREFERRED EMBODIMENT

A wall 1 of a caravan 2, for example, comprises two parallel aluminum sheets, between which an insulation material is provided. The sheet 3 positioned at the outside of caravan 2 has a relief comprising studs 4. Said relief is formed in the aluminum sheet 3 by means of a roller. A dent 5 in sheet 3 resulting from a collision is repaired by means of the method according to the invention in the following manner.

If dent 5 exhibits a through hole, said hole is closed with a two component epoxy adhesive. After the epoxy has cured, the dent 5 is filled with a curable filler, such as Araldite 2015, to a level which corresponds with the initial level of the relief. After the filler has cured, the damaged surface is ready for being profiled. The rolled sheet 3 comprises a recurring relief, which recurs over a pitch distance which corresponds with the length of the circumference of the roller used for forming the relief. It is attempted to find the recurring relief on the surface of sheet 3. It has become apparent. that with caravan walls, the pitch distance is generally smaller than 25 cm, so that a recurring relief will be present on practically every sheet 3.

Then a detaching film of, for example, polyvinyl alcohol, is applied to a relief corresponding with the damaged relief, followed by the application of a two component gel, for example gelcoat having a thickness of 2–3 mm. The detaching film makes it possible to remove the cured gel 6 from sheet 3 in a simple manner, whereby the gel comprises an impression 7 of the desired relief on the side that has abutted against the relief. The cured gel forms a mould 6 for forming a relief on the surface of the damaged part. The mould 6 also comprises an impression of the undamaged circumferential area of the dent 5 along its circumference. An additional filler is applied to the cured filler of the dent 5, after which the mould 6 is placed on the filler, in such a manner that the impression of the relief in the edge of mould 6 lies opposite an undamaged studded relief being complementary thereto on sheet 3. A foil 8 is placed over mould 6, which foil is temporarily attached to sheet 3 by means of an adhesive 9. Then a space positioned between the surface of sheet 3 and the foil is connected to a vacuum pump (not shown) via an opening 10 provided in the foil 8. Said space is evacuated to an absolute vacuum of 7 mbar by means of said vacuum pump. As a result of the outside pressure the foil 8 is uniformly pressed against the mould 6, so that the mould 6 will deform the filler with a uniformly distributed force into a relief which is complementary to the impression. The filler is applied in a sufficient amount, whereby any excess filler will be pressed out via the edges of the mould 6. After the filler has slightly cured, the vacuum is released and the foil 8 is removed. Said excess filler along the edge of mould 6 is removed before the filler has completely cured. Mould 6 is made of a material which does not adhere to the filler, or a detaching film is applied to the mould 6, which facilitates removing the mould 6. The relief formed in this manner fully corresponds with the original relief of the damaged surface. If desired the surface is finished with for example a lacquer.

The pressing down of mould 6 may take place in any other manner, but preferably in a manner wherein a uniform pressure is exerted on mould 6.

The method according to the invention is also suitable for repairing other damaged, profiled surfaces, such as for example a corrugated car door.

If the relief is not a recurring relief it will be necessary to use a relief which resemble the damaged relief as much as possible, whereby the repaired relief that has been formed may be finished by hand.

What is claimed is:

1. A method for repairing a locally damaged, dented surface of a wall, which wall is provided with a three dimensional recurring relief pattern with a portion of said recurring relief pattern being destroyed in the dented portion of said wall, comprising the steps:

(1) filling said dented portion of said wall with a single layer of filler to the initial level adequate to allow formation therein of a relief pattern which exactly matches the relief pattern which formerly existed in said dented portion;

(2) finding an undamaged part of the surface of said wall having a relief pattern which exactly matches the former relief pattern in the damaged surface of said wall;

(3) making a mould of the relief pattern in the undamaged portion of said wall located in step (2) such that said mould has therein an impression of the relief pattern that formerly existed in the damaged portion of said wall to be repaired said mould being large enough to completely cover said damaged area and having circumferential portions that contain an impression which can be matched to undamaged portions of said wall surrounding said damaged area of said wall (4) placing said mould over said filler such that when said mould is pressed into said filler, said relief patter which originally existed in the damaged area being repaired will be formed; and (5) forming a relief in said filler which exactly matches said original relief by pressing said mould into said filler to form an impression of the original relief pattern in said filler and removing any excess filler before the filler has completely cured.

2. A method according to claim 1, further comprising the step, when a rolled relief pattern is concerned, determining the pitch distance over which the relief pattern recurs in finding a portion of said wall with a relief pattern which exactly matches the relief pattern that formerly existed in the damaged portion of said wall to be repaired.

3. A method according to claim 1, characterized in that the dented surface is first filled with a curable filler to a level which corresponds with a desired initial level of the relief to be impressed, after which the filler is cured, whereupon another amount of filler is applied and, after application of said second filler, said mould is positioned so as to form an impression in said second filler which exactly matches the formerly existing relief pattern and said mould is pressed into said second filler before it cures so as to form an exact match of said formerly existing relief pattern in said second filler, and removing any excess second filler which is squeezed out from the edges of said mold before said excess second filler cures.

4. A method according to claim 1 or characterized in that said mould is pressed into said filler by performing the following steps:

supporting said mould along its circumference against an undamaged part of the surface of said wall;

attaching a foil over said mould and temporarily attaching said foil to the surface of said wall surrounding said mould so as to form an airtight pocket around and above said mould;

evacuating said pocket by means of a vacuum pump such that atmospheric pressure exerts a uniform pressure on said mould to press said mould into said filler.

5. A method according to claim 1 or 3, wherein said step of making said mould further comprises the steps:

applying a detaching film on an undamaged part of the surface of said wall that has a relief pattern that exactly matches the former relief pattern in the damaged portion of said wall;

applying a curable gel to the portion of said relief pattern on an undamaged portion of said wall that exactly matches the former relief pattern in the damaged area of the wall;

removing said gel from said surface after said gell has cured such that said gel has formed therein an impression of the relief of said surface of the undamaged portion of said wall that exactly matches the former relief in said damaged portion, and using said cured gel as said mould.

6. A method for repairing a locally damaged, dented surface of a wall which has a relief pattern or three dimensional pattern therein, comprising the steps of:

(1) filling the dented area with a first filler to an initial level adequate to leave room for a second filler in which a relief pattern which formerly existed in the damaged area will be re-formed and curing said first filler;

(2) finding an undamaged portion of the relief pattern in the wall which exactly matches the relief pattern which formerly existed in the dented area of the wall;

(3) making a mold of the relief pattern in the undamaged portion of the wall located in step (2) with the dimensions of said mold being large enough to completely cover said damaged portion including a portion of the undamaged portion around said damaged portion;

(4) filling the damaged area with a second filler;

(5) positioning said mold over said filler so as to exactly match the former relief pattern which formerly existed in said damaged area and pressing the mold formed in step (3) into said second filler so as to mold the desired relief pattern into said second filler; and (6) removing the mold and removing any excess of said second filler, if necessary, before said second filler cures and curing said second filler.

7. A method of repairing a locally damaged portion of a wall having a three dimensional relief pattern formed therein, comprising the steps:

(1) filling said damaged portion of said wall with a first filler to the initial level of the relief pattern in the surrounding portion of the wall and allowing said first filler to cure;

(2) finding an undamaged part of the surface of said wall having a relief pattern which corresponds with the former relief pattern in the damaged surface of said wall;

(3) making a mould of the relief pattern in the undamaged portion of said wall located in step (2) by applying a detaching film to the undamaged portion of the wall and applying a gelcoat having a thickness adequate to form a complete impression of the relief pattern therein and allowing said gelcoat to cure such that a mould of said relief pattern is formed, said mould has therein an exact duplicate impression of the relief pattern that formerly existed in the damaged portion of said wall to be repaired, said mould being large enough to completely cover said damaged area and having circumferential portions that contain an impression which can be matched to undamaged portions of said wall surrounding said damaged area of said wall, and then removing said cured gel for use as said mould;

(4) filling said damaged portion of said wall with a second additional filler to a level that is sufficient to supply enough material to fill said mould when said mould is pressed into said second filler so as to enable formation of said relief pattern which originally existed in the damaged area being repaired; and (5) forming a relief in said second filler which exactly matches said original relief by placing said mould formed in step (3) on the damaged portion of said wall such that the impression in said mould will mold said second filler to exactly match the original relief pattern that formerly existed in said damaged portion of said wall and by pressing said mould into said second filler to form an impression of the original relief pattern in said second filler and removing any excess second filler before said second filler has completely cured, said pressing of said mould into said second filler accomplished by supporting said mould over said filler in the location and orientation established in said placing step and applying a foil over said mould and temporarily bonding said foil to said wall circumferentially around said mould with adhesive to form an airtight pocket between said foil and said mould, and evacuating the space between said mould and said foil such that atmospheric pressure presses said mould into said second filler with an even pressure;

(6) after said second filler has cured enough to retain its shape but is not yet completely cured, releasing said vacuum and removing said foil and removing any excess second filler which has squeezed out from around the edges of said mould;

(7) removing said mould after said second filler has cured.

* * * * *